United States Patent
Yang (10) Patent No.: US 9,419,524 B2
(45) Date of Patent: Aug. 16, 2016

(54) BOOST TYPE DIRECT CURRENT OUTPUT CONTROL CIRCUIT DEVICE CONTROLLED BY SUBPOWER

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 402 days.

(21) Appl. No.: 13/927,247

(22) Filed: Jun. 26, 2013

(65) Prior Publication Data
US 2015/0003114 A1      Jan. 1, 2015

(51) Int. Cl.
| | |
|---|---|
| *H02M 3/22* | (2006.01) |
| *H02M 3/156* | (2006.01) |
| *H02M 3/335* | (2006.01) |
| *H02M 1/00* | (2006.01) |

(52) U.S. Cl.
CPC ............... *H02M 3/22* (2013.01); *H02M 3/156* (2013.01); *H02M 3/335* (2013.01); *H02M 2001/0093* (2013.01)

(58) Field of Classification Search
CPC ....... H02M 3/156; H02M 3/22; H02M 3/335; H02M 2001/0093; H02M 3/33592; H02M 1/38; Y02B 70/1475
See application file for complete search history.

(56) References Cited

U.S. PATENT DOCUMENTS

| | | | | |
|---|---|---|---|---|
| 6,493,242 B1 * | 12/2002 | Riggio | ................... | H02M 1/14 363/131 |
| 7,212,416 B2 * | 5/2007 | Kyono | .............. | H02M 3/33592 363/127 |
| 2003/0227280 A1 * | 12/2003 | Vinciarelli | ............ | H02M 1/088 323/265 |
| 2009/0257248 A1 * | 10/2009 | Baptiste | ............ | H02M 3/33561 363/20 |
| 2011/0075446 A1 * | 3/2011 | Doutreloigne | .... | H02M 3/33592 363/15 |

* cited by examiner

*Primary Examiner* — Jessica Han
*Assistant Examiner* — Demetries A Gibson
(74) *Attorney, Agent, or Firm* — Bacon & Thomas, PLLC (57) ABSTRACT

A direct current power source includes an electric control unit (ECU101) for converting a portion of input direct current electric energy into alternating polarity electric energy or ripple electric energy. The converted alternating polarity or ripple electric energy is supplied to the primary winding of a transformer, and an alternating polarity or ripple electric energy output by the secondary winding of the transformer is rectified by a full wave rectifier for use as a direct current auxiliary power source. The direct current power source uses voltage accumulation to boost the direct current electric energy, eliminating the need for a full power transformer.

14 Claims, 4 Drawing Sheets

BOOST TYPE DIRECT CURRENT OUTPUT CONTROL CIRCUIT DEVICE CONTROLLED BY SUBPOWER

BACKGROUND OF THE INVENTION (a) Field of the Invention

The present invention utilizes partial electric energy of a direct current power source by converting a portion of the input direct current power though an electric control unit (ECU101) into alternating polarity electric energy or ripple electric energy and supplying the alternating polarity or ripple electric energy to the primary side of a transformer, and by converting alternating polarity electric energy or ripple electric energy output from the secondary side of the transformer through a full wave rectifier into a direct current auxiliary power source that is added to the input direct current power in order to boost a direct current output voltage. The direct current auxiliary power source performs serial voltage accumulation of the partial direct current input from the direct current power source via a direct current input terminal (INPT101), with a direct current output terminal (OUPT102) serving to output a boosted direct current electric energy. The electric control unit ensures that the transformer only needs to supply power for boosting, so that a full power transformer is not required, thereby reducing weight and production costs.

(b) Description of the Prior Art

For conventional voltage boosting performed by a direct current power source, the direct current has to be converted into alternating polarity electric energy first, and then a full power transformer is utilized for enabling the alternating polarity electric energy to be boosted so as to output a relatively higher voltage, which then is rectified back to direct current electric energy for achieving the direct current boosting effect. However, the prior art has following disadvantages: the volume and the weight of the full power transformer are relatively large and heavy, so that production cost is increased and core losses are also increased.

SUMMARY OF THE INVENTION

The present invention converts partial electric energy of a direct current power source through an electric control unit (ECU101) into alternating polarity electric energy or ripple electric energy and supplies the alternating polarity or ripple electric energy to the primary side of a transformer, and then converts the alternating polarity electric energy or ripple electric energy output from the secondary side of the transformer through a full wave rectifier into a direct current auxiliary power source, so that the direct current auxiliary power source is enabled to perform a serial voltage accumulation of partial power from the direct current power source input through a direct current input terminal (INPT101), a direct current output terminal (OUPT102) serving as a boosted direct current electric energy output. Production cost and weight are reduced because only needs to supply power for boosting, so that a full power transformer is not required.

The boost type direct current output control circuit device controlled by partial power of the present invention may be applied in a direct current power supply with a single voltage output having no voltage regulating function or regulative voltage output, or to a direct current power supply with a single voltage stabilizing output or regulative voltage stabilizing output, including power supplies that require the input of direct current electric energy, such as a power supply for an electric recharger with controllable voltage and current, a DC to DC converter in which the direct current power is boosted for DC output, a device for regulating the speed and/or torque of a DC brush or brushless motor in which driving is varied by regulating voltage and current, a device for lighting adjustment of an illumination lamp utilizing electric energy that is converted into photo energy, a power supply for adjusting temperature of an electric heating device, a power supply for a device having an electrochemical function, and a power supply for direct current welding or direct current electricity discharging.

DESCRIPTION OF MAIN COMPONENT SYMBOLS

BR101: Bridge rectifier
CR101: Diode
ECU101: Electric control unit
ID100: Current detector
IPD101: Input operation device
INPT101: Direct current input terminal
OUPT102: Direct current output terminal
RFC100-RFC200: Ripple suppress circuit device
T3: Auxiliary direct current output terminal
TR101: Transformer VD100: Voltage detector
W1: Primary windings
W2: Secondary windings

DETAILED DESCRIPTION OF THE PREFERRED EMBODIMENTS

For conventional voltage boosting performed by the direct current power source, the direct current has to be converted into alternating polarity electric energy first, and then a full power transformer is utilized for enabling the alternating polarity electric energy to be boosted so as to achieve an output with relatively higher voltage, which is then rectified to direct current electric energy for achieving a direct current boosting effect. However, the prior art has the following disadvantages: the volume and the weight of the full power transformer are relatively large and heavy, the production cost is increased, and core losses are also increased.

The present invention uses an electric control unit (ECU101) to convert only a part of the electric energy of a direct current power source into alternating polarity electric energy or ripple electric energy for supply to the primary side of a transformer, so that the alternating polarity electric energy or ripple electric energy output from the secondary side of the transformer an converted back to direct current through a full wave rectifier to provide an auxiliary power source that boosts the input voltage by serial voltage accumulation of the partial direct current power input from a direct current input terminal (INPT101), the direct current output terminal (OUPT102) serving to output a boosted direct current electric energy so that the transformer only needs to supply power for boosting. As a result, a full power transformer is not required, thereby reducing the weight and production cost.

The boost type direct current output control circuit device controlled by partial power of the present invention may be applied to a direct current power supply with a single voltage output having no voltage regulating function or regulative voltage output, or a to a direct current power supply with a single voltage stabilizing output or regulative voltage stabilizing output, including power supplies that require the input of direct current electric energy such as a power supply for an electric recharger with controllable voltage and current, a DC to DC converter in which the direct current power is boosted for DC output, a device for regulating the speed and/or torque of a DC brush or brushless motor in which driving is varied through regulating voltage and current, a lighting adjustment device of an illumination lamp utilizing electric energy converted into photo energy, a power supply for adjusting temperature of an electric heating device, a power supply for a device having an electrochemical function, and a power supply for direct current welding or direct current electricity discharging.

Figure 1:
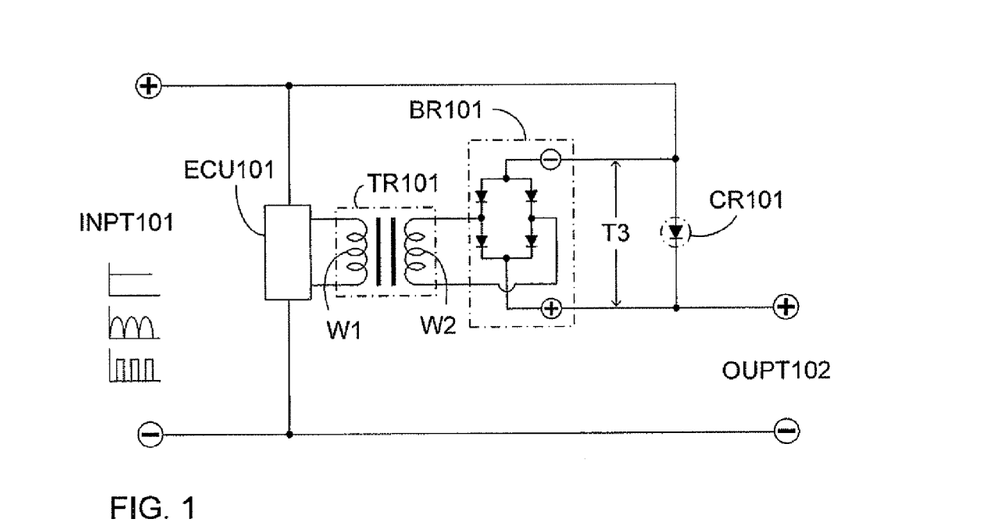
FIG. 1 is a block diagram showing the main circuit and components according to an embodiment of the present invention.

FIG. 1 is a block diagram showing the main circuit components according to the present invention.

As shown in FIG. 1, the main circuit components include:

Electric control unit (ECU101), which consists of electromechanical elements and/or solid-state electric elements and/or microprocessors and/or relevant software, and is used for converting the direct current electric energy input through the direct current input terminal (INPT101) into alternating polarity electric energy for being supplied to primary windings (W1) of a transformer (TR101), the secondary windings (W2) of the transformer (TR101) serving to output the alternating polarity electric energy with a relative set transformation ratio, the alternating polarity electric energy then being transmitted through a direct current output end of a bridge rectifier (BR101) to an auxiliary direct current output terminal (T3). The direct current input terminal (INPT101) is connected to the positive polarity of the electric control unit (ECU101), and is connected to the negative polarity of the direct current auxiliary power source. The positive polarity of the direct current auxiliary power source is connected to a positive polarity of the direct current output terminal (OUPT102), while the negative polarity of the direct current input terminal (INPT101) is connected to the negative polarity of the electric control unit (ECU101), and to the negative polarity of the direct current output terminal (OUPT102). A diode (CR101) having a bypass function is connected in parallel between the positive polarity and the negative polarity of the direct current auxiliary power source. the current input end of the diode (CR101) is connected to the output negative polarity of the bridge rectifier (BR101), and the output end of the diode (CR101) is connected to the output positive polarity of the bridge rectifier (BR101), thereby enabling the direct current power source to be forwardly connected in series with the direct current auxiliary power source and the direct current output terminal (OUPT102) to serve as an output for a boosted voltage made up of the accumulated voltages of the above two power sources, so that a partial power voltage controlling type direct current output driving circuit is established.

Figure 2:
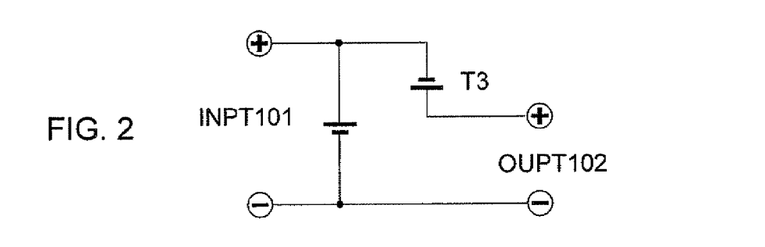
FIG. 2 is a schematic view showing an equivalent circuit with boosting function according to the present invention.

FIG. 2 is a schematic view showing an equivalent circuit with the boosting function according to the present invention.

As shown in FIG. 2, the direct current voltage input through the direct current input terminal (INPT101) and the direct current voltage output by the secondary side of the transformer (TR101) and rectified by the bridge rectifier (BR101) are forwardly connected in series, the two voltages being accumulated for being boosted and output from the direct current output terminal (OUPT102).

Figure 3:
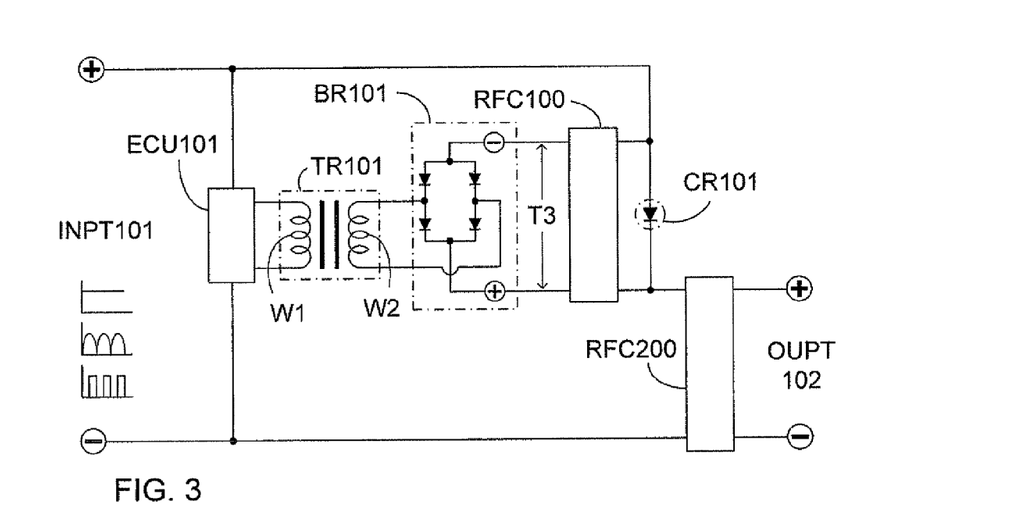
FIG. 3 is a circuit block diagram illustrating a ripple suppress circuit device installed in the circuit of FIG. 1 according to one embodiment of the present invention.

FIG. 3 is a circuit block diagram illustrating a ripple suppress circuit device installed in the circuit of FIG. 1 according to one embodiment of the present invention.

As shown in FIG. 3, the main circuit shown in FIG. 1, further includes an auxiliary direct current output terminal (T3) of the bridge rectifier (BR101) being connected in parallel with a ripple suppress circuit device (RFC100) and/or two ends of the direct current output terminal (OUPT102) being connected in parallel with a ripple suppress circuit device (RFC200), thereby reducing the ripple of the auxiliary direct current electric energy.

Figure 4:
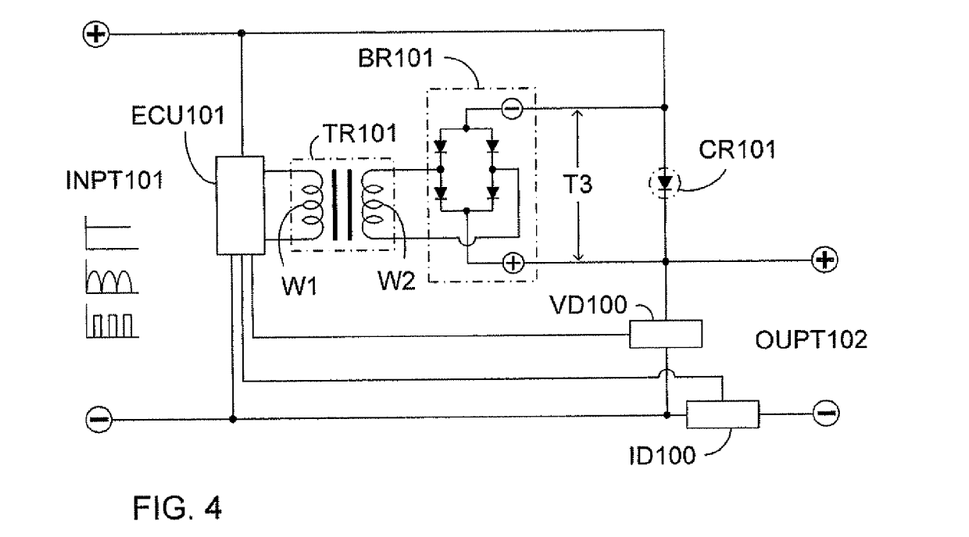
FIG. 4 is a circuit block diagram illustrating the direct current output terminal (OUPT102) shown in FIG. 1 being installed with an electric energy detector, according to one embodiment of the present invention.

FIG. 4 is a circuit block diagrams illustrating the direct current output terminal (OUPT102) shown in FIG. 1 being installed with an electric energy detector, according to one embodiment of the present invention.

As shown in FIG. 4, the direct current output terminal (OUPT102) of the main circuit shown in FIG. 1 is installed with an electric energy detector. The electric energy detector includes a voltage detector (VD100) and/or a current detector (ID100), one or both of the detectors serving to display the voltage and/or the current, and/or to feedback detecting signals to the electric control unit (ECU101), thereby enabling the input electric energy from the electric control unit (ECU101) to the primary windings (W1) of the transformer (TR101) to be controlled with respect to the output voltage and/or output current mode set through the electric control unit (ECU101), so that the output voltage and/or output current of the auxiliary direct current output terminal (T3) can be regulated, and the output voltage and/or current of the direct current output terminal (OUPT102) can be correspondingly varied.

Figure 5:
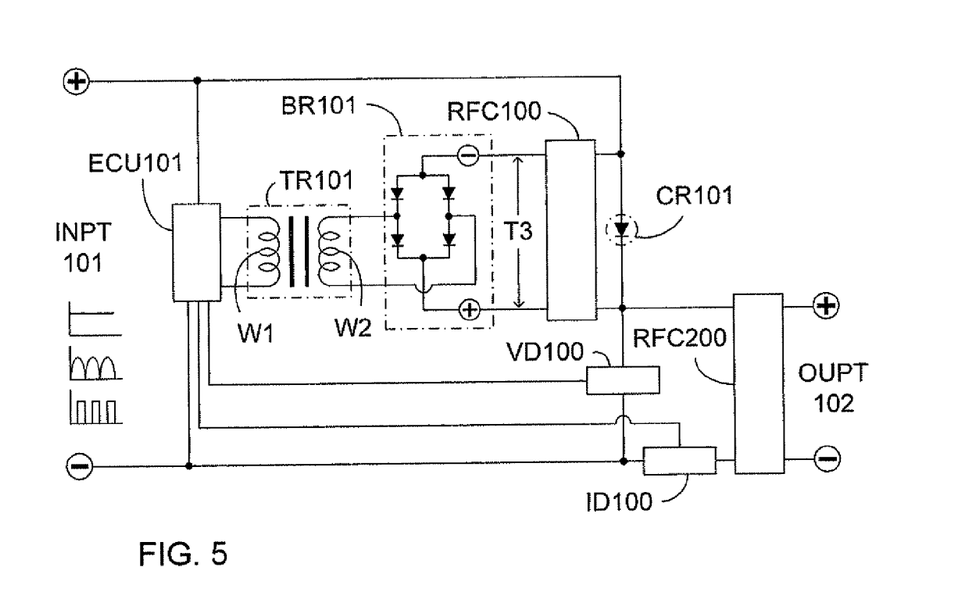
FIG. 5 is a circuit block diagram illustrating the circuit of FIG. 1 being installed with a ripple suppress circuit device and the direct current output terminal (OUPT102) of FIG. 1 being installed with an electric energy detector, according to one embodiment of the present invention.

FIG. 5 is a circuit block diagram illustrating the circuit of FIG. 1 being installed with a ripple suppress circuit device and the direct current output terminal (OUPT102) being installed with an electric energy detector, according to one embodiment of the present invention.

As shown in FIG. 5, the auxiliary direct current output terminal (T3) of the bridge rectifier (BR101) of the circuit of FIG. 1 is connected in parallel with a ripple suppress circuit device (RFC100) and/or two ends of the direct current output terminal (OUPT102) are connected in parallel with a ripple suppress circuit device (RFC200), and the direct current output terminal (OUPT102) is installed with an electric energy detector. The electric energy detector includes a voltage detector (VD100) and/or a current detector (ID100), one or both of the detectors serving to display the voltage and/or the current, and/or to feedback detecting signals to the electric control unit (ECU101), thereby enabling the input electric energy from the electric control unit (ECU101) to the primary windings (W1) of the transformer (TR101) to be controlled with respect to the output voltage and/or output current mode set through the electric control unit (ECU101), so that the output voltage and/or output current of the auxiliary direct current output terminal (T3) can be controlled, and the output voltage and/or current of the direct current output terminal (OUPT102) can be correspondingly varied.

Figure 6:
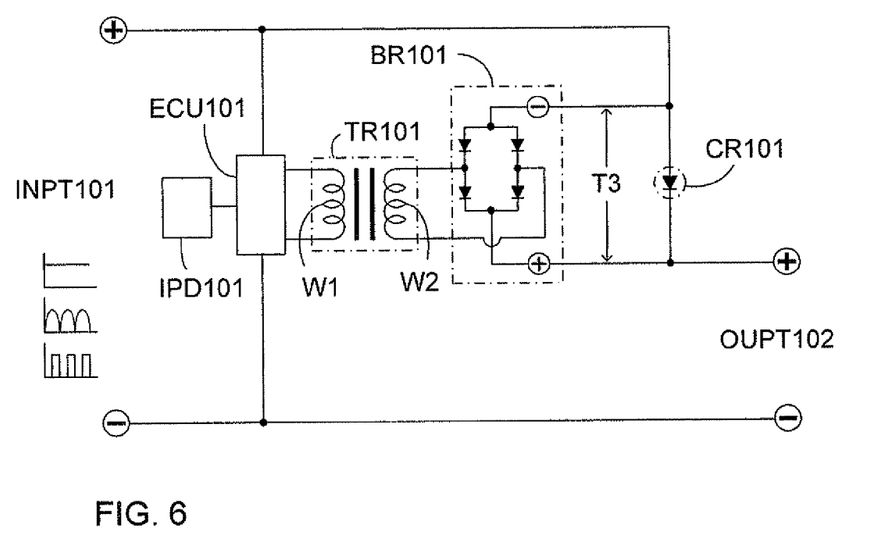
FIG. 6 is a circuit block diagram illustrating the circuit of FIG. 1 being installed with an input operation device (IPD101) for controlling an electric control unit (ECU101) so as to control the output voltage of the direct current output terminal (OUPT102).

FIG. 6 is a circuit block diagram illustrating the circuit of FIG. 1 being installed with an input operation device (IPD101) for controlling the electric control unit (ECU101) so as to control the output voltage of the direct current output terminal (OUPT102).

The circuit shown in FIG. 6 is arranged as follows:

Input operation device (IPD101) includes electromechanical elements or solid-state electric elements and is controlled by manual operation or by external electric signals for transferring corresponding signals to the electric control unit (ECU101);

Electric control unit (ECU101) includes electromechanical elements and/or solid-state electric elements and/or microprocessors and/or relevant software, and is controlled by the input operation device (IPD101) for converting direct current electric energy input through the direct current input terminal (INPT101) into alternating polarity electric energy for being supplied to primary windings (W1) of a transformer (TR101), the secondary windings (W2) of the transformer (TR101) serving to output the alternating polarity electric energy with a relative set transformation ratio, and the output alternating polarity electric energy being transferred through the direct current output end of a bridge rectifier (BR101) to an auxiliary direct current output terminal (T3). The direct current input terminal (INPT101) is connected to the positive polarity of the electric control unit (ECU101), and is connected to the negative polarity of the direct current auxiliary power source. The positive polarity of the direct current auxiliary power source is connected to the positive polarity of the direct current output terminal (OUPT102), while the negative polarity of the direct current input terminal (INPT101) is connected to the negative polarity of the electric control unit (ECU101), and to the negative polarity of the direct current output terminal (OUPT102). A diode (CR101) having bypass function is connected in parallel between the positive polarity and the negative polarity of the direct current auxiliary power source. The current input end of the diode (CR101) is connected to the output negative polarity of the bridge rectifier (BR101), and the output end of the diode (CR101) is connected to the output positive polarity of the bridge rectifier (BR101), thereby enabling the direct current power source to be forwardly connected in series with the direct current auxiliary power source, and the direct current output terminal (OUPT102) to serve as an output for the boosted voltage made up of the accumulated voltages of the above two power sources, so that a partial power voltage controlling type direct current output driving circuit is established.

Figure 7:
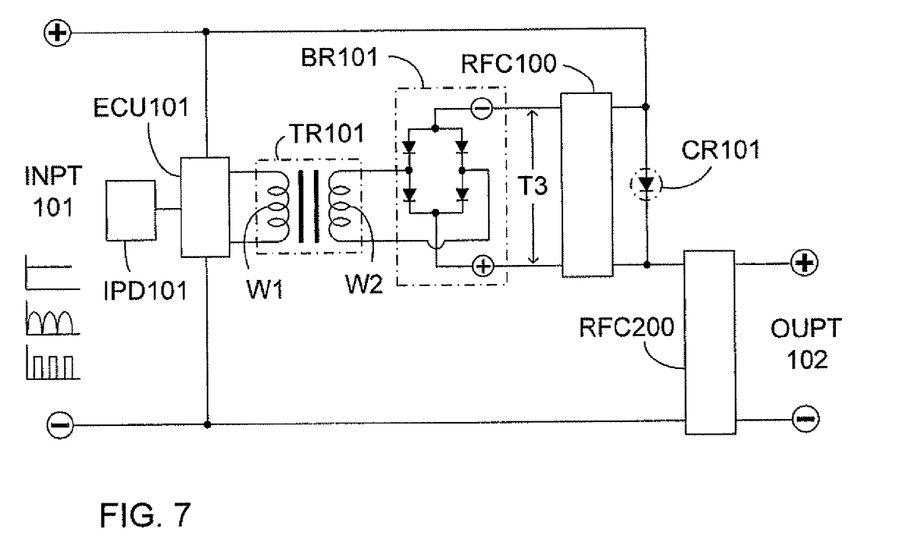
FIG. 7 is a circuit block diagram illustrating the embodiment of FIG. 3 being installed with an input operation device (IPD101) for controlling the electric control unit (ECU101) so as to control the output voltage of the direct current output terminal (OUPT102).

FIG. 7 is a circuit block diagram illustrating the embodiment disclosed in FIG. 3 being installed with an input operation device (IPD101) for controlling the electric control unit (ECU101) so as to control the output voltage of the direct current output terminal (OUPT102).

The circuit shown in FIG. 7 is arranged as follows:

Input operation device (IPD101) includes electromechanical elements or solid-state electric elements, and is controlled by manual operation or by external electric signals for transferring corresponding signals to the electric control unit (ECU101).

Electric control unit (ECU101) includes electromechanical elements and/or solid-state electric elements and/or microprocessors and/or relevant software, which are controlled by the input operation device (IPD101) and used for converting direct current electric energy input through the direct current input terminal (INPT101) into alternating polarity electric energy for being supplied to primary windings (W1) of a transformer (TR101), the secondary windings (W2) of the transformer (TR101) serving to output the alternating polarity electric energy with a relative set transformation ratio, and the output alternating polarity electric energy being transmitted through the direct current output end of a bridge rectifier (BR101) to an auxiliary direct current output terminal (T3). The direct current input terminal (INPT101) is connected to the positive polarity of the electric control unit (ECU101), and to the negative polarity of the direct current auxiliary power source. The positive polarity of the direct current auxiliary power source is connected to the positive polarity of the direct current output terminal (OUPT102), while the negative polarity of the direct current input terminal (INPT101) is connected to the negative polarity of the electric control unit (ECU101), and to the negative polarity of the direct current output terminal (OUPT102). A diode (CR101) having a bypass function is connected in parallel between the positive polarity and the negative polarity of the direct current auxiliary power source. The current input end of the diode (CR101) is connected to the output negative polarity of the bridge rectifier (BR101), and the output end of the diode (CR101) is connected to the output positive polarity of the bridge rectifier (BR101), thereby enabling the direct current power source to be forwardly connected in series with the direct current auxiliary power source, and the direct current output terminal (OUPT102) to serve as an output for the boosted voltage made up of the accumulated voltages of the above two power sources, so that a partial power voltage controlling type direct current output driving circuit is established.

The auxiliary direct current output terminal (T3) of the bridge rectifier (BR101) is connected in parallel with a ripple suppress circuit device (RFC100) and/or two ends of the direct current output terminal (OUPT102) are connected in parallel with a ripple suppress circuit device (RFC200).

Figure 8:
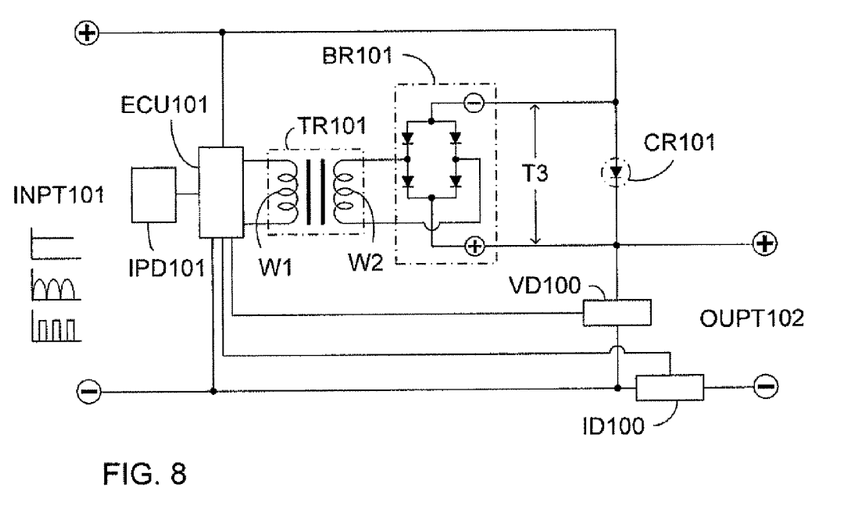
FIG. 8 is a circuit block diagram illustrating the embodiment of FIG. 4 being installed with an input operation device (IPD101) for controlling the electric control unit (ECU101) so as to control the output voltage of the direct current output terminal (OUPT102).

FIG. 8 is a circuit block diagram illustrating the embodiment disclosed in FIG. 4 being installed with an input operation device (IPD101) for controlling the electric control unit (ECU101) so as to control the output voltage of the direct current output terminal (OUPT102).

The circuit shown in FIG. 8 is arranged as follows:

Input operation device (IPD101) includes electromechanical elements or solid-state electric elements controlled by manual operation or controlled by external electric signals for transferring corresponding signals to the electric control unit (ECU101).

Electric control unit (ECU101) includes electromechanical elements and/or solid-state electric elements and/or microprocessors and/or relevant software, which are controlled by the input operation device (IPD101) and used for converting direct current electric energy input through the direct current input terminal (INPT101) into alternating polarity electric energy for supply to primary windings (W1) of a transformer (TR101), the secondary windings (W2) of the transformer (TR101) serving as an output for the alternating polarity electric energy with a relative set transformation ratio, the output alternating polarity electric energy being transmitted through the direct current output end of a bridge rectifier (BR101) to an auxiliary direct current output terminal (T3). The direct current input terminal (INPT101) is connected to the positive polarity of the electric control unit (ECU101), and to the negative polarity of the direct current auxiliary power source. The positive polarity of the direct current auxiliary power source is connected to the positive polarity of the direct current output terminal (OUPT102), while the negative polarity of the direct current input terminal (INPT101) is connected to the negative polarity of the electric control unit (ECU101), and connected to the negative polarity of the direct current output terminal (OUPT102). A diode (CR101) having a bypass function is connected in parallel between the positive polarity and the negative polarity of the direct current auxiliary power source. The current input end of the diode (CR101) is connected to the output negative polarity of the bridge rectifier (BR101), and the output end of the diode (CR101) is connected to the output positive polarity of the bridge rectifier (BR101), thereby enabling the direct current power source to be forwardly connected in series with the direct current auxiliary power source and the direct current output terminal (OUPT102) to serve as an output for the boosted voltage made up of the accumulated voltages of the above two power sources, so that a partial power voltage controlling type direct current output driving circuit is established.

The direct current output terminal (OUPT102) is installed with an electric energy detector. The electric energy detector includes a voltage detector (VD100) and/or a current detector (ID100), one or both of the detectors serving to display the voltage and/or the current, and/or to feedback detecting signals to the electric control unit (ECU101), thereby enabling the input electric energy from the electric control unit (ECU101) to the primary windings (W1) of the transformer (TR101) to be controlled with respect to the output and/or output voltage, and the current mode to be set through the electric control unit (ECU101), so that the output voltage and/or output current of the auxiliary direct current output terminal (T3) can be regulated, and the output voltage and/or current of the direct current output terminal (OUPT102) can be correspondingly varied.

Figure 9:
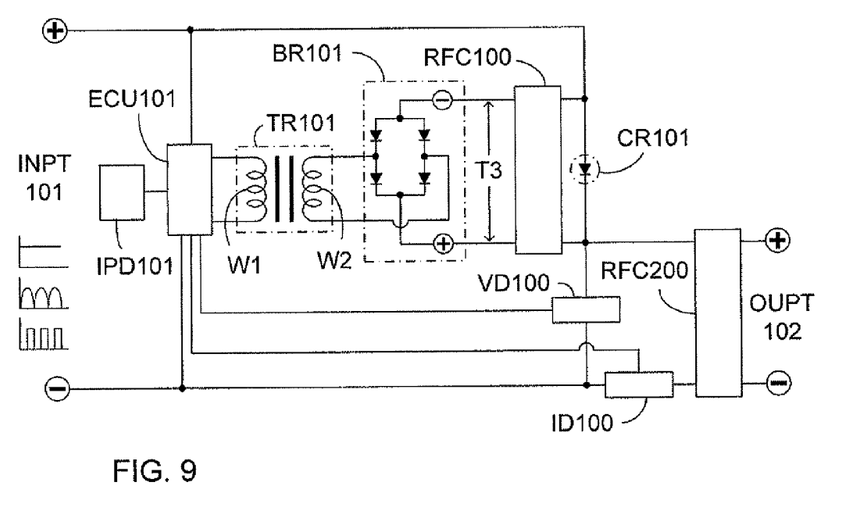
FIG. 9 is a circuit block diagram illustrating the embodiment of FIG. 5 being installed with an input operation device (IPD101) for controlling the electric control unit (ECU101) so as to control the output voltage of the direct current output terminal (OUPT102).

FIG. 9 is a circuit block diagram illustrating the embodiment disclosed in FIG. 5 being installed with an input operation device (IPD101) for controlling the electric control unit (ECU101) so as to control the output voltage of the direct current output terminal (OUPT102);

The circuit shown in FIG. 9 is arranged as follows:

Input operation device (IPD101) includes electromechanical elements and/or solid-state electric elements, and is controlled by manual operation or controlled by external electric signals for transferring corresponding signals to the electric control unit (ECU101).

Electric control unit (ECU101) includes electromechanical elements and/or solid-state electric elements and/or microprocessors and/or relevant software, which are controlled by the input operation device (IPD101) and used for converting direct current electric energy inputted through direct current input terminal (INPT101) into alternating polarity electric energy for supply to primary windings (W1) of a transformer (TR101), the secondary windings (W2) of the transformer (TR101) serving to output the alternating polarity electric energy with a relative set transformation ratio, and the output alternating polarity electric energy being transmitted through the direct current output end of a bridge rectifier (BR101) to an auxiliary direct current output terminal (T3). The direct current input terminal (INPT101) is connected to the positive polarity of the electric control unit (ECU101), and to the negative polarity of the direct current auxiliary power source. The positive polarity of the direct current auxiliary power source is connected to the positive polarity of the direct current output terminal (OUPT102), while the negative polarity of the direct current input terminal (INPT101) is connected to the negative polarity of the electric control unit (ECU101), and to the negative polarity of the direct current output terminal (OUPT102). A diode (CR101) having a bypass function is connected in parallel between the positive polarity and the negative polarity of the direct current auxiliary power source. The current input end of the diode (CR101) is connected to the output negative polarity of the bridge rectifier (BR101), and the output end of the diode (CR101) is connected to the output positive polarity of the bridge rectifier (BR101), thereby enabling the direct current power source to be forwardly connected in series with the direct current auxiliary power source, and the direct current output terminal (OUPT102) to be serve as an output for the boosted voltage made up of the accumulated voltages of the above two power sources, so that a partial power voltage controlling type direct current output driving circuit is established.

In addition, the direct current output terminal (OUPT102) is installed with an electric energy detector. The electric energy detector includes a voltage detector (VD100) and/or a current detector (ID100), one or both of which serves to display the voltage and/or the current, and/or to feedback detecting signals to the electric control unit (ECU101), thereby enabling the input electric energy from the electric control unit (ECU101) to the primary windings (W1) of the transformer (TR101) to be controlled with respect to the output voltage and/or output current mode set through the electric control unit (ECU101), so that the output voltage and/or output current of the auxiliary direct current output terminal (T3) can be regulated, and the output voltage and/or current of the direct current output terminal (OUPT102) can be correspondingly varied.

The auxiliary direct current output terminal (T3) of the bridge rectifier (BR101) is connected in parallel with a ripple suppress circuit device (RFC100), and/or two ends of the direct current output terminal (OUPT102) are connected in parallel with a ripple suppress circuit device (RFC200).

The illustrated electric energy detector may be arranged as follows:

Voltage detector (VD100) includes a voltage detector that converts varied voltage values into analog or digital signals for transmission to the electric control unit (ECU101) or for further being displayed.

Current detector (ID100) includes a current detector that converts varied current values into analog or digital signals for transmission to the electric control unit (ECU101) or for further being displayed.

As shown in FIGS. 5 to 9, the electric energy detector, including the voltage detector (VD100) and/or the current detector (ID100), provides feedback signals for controlling and regulating the input electric energy of the primary windings (W1) of the transformer (TR101) with respect to the output voltage and/or current mode, and thereby provides one or more than one of following controlling functions:

(1) Through the operation of the current detector (ID100) and/or the manual control of the input operation device (IPD101) and/or the operation of the electric control unit (ECU101), the value of the output current is controlled, including control by limiting the maximum output current.

(2) Through the operation of the current detector (ID100) and/or the manual control of the input operation device (IPD101) and/or the operation of the electric control unit (ECU101), the output current can be controlled as a constant or regulative constant current.

(3) Through the operation of the current detector (ID100) and/or the manual control of the input operation device (IPD101) and/or the operation of the electric control unit (ECU101), the value of the output current is provided with multi-variable control such as an electric charging mode.

(4) Through the operation of the voltage detector (VD100) and/or the manual control of the input operation device (IPD101) and/or the operation of the electric control unit (ECU101), the value of output voltage can be controlled, including control by limiting the maximum voltage output.

(5) Through the operation of the voltage detector (VD100) and/or the manual control of the input operation device (IPD101) and/or the operation of the electric control unit (ECU101), the output voltage can be controlled as a constant or regulative constant voltage.

(6) Through the operation of the voltage detector (VD100) and/or the manual control of the input operation device (IPD101) and/or the operation of the electric control unit (ECU101), the value of output voltage is provided with multi-variable control such as an electric charging mode.

The direct current power source for the boost type direct current output control circuit device controlled by partial power of the preferred embodiments may include various physical direct current power sources, e.g., a electromechanical generator driven by mechanical energy or manual force or hydraulic energy, a photovoltaic device that converts light energy into electric energy, an electrochemical direct current electric energy generating device such as a primary battery, a secondary storing or discharging battery, a fuel cell device, a biological direct current electric energy generating device, or a rectified alternating current power source or variable direct current power source.

The invention claimed is:

1. A boost type direct current output control circuit device, comprising: an electric control unit (ECU101) connected between direct current input terminals (INPT101) for converting a portion of direct current electrical energy into alternating polarity electric energy; a transformer (TR101) having at least one primary winding (W1) connected to an output of the electric control unit (ECU101) and at least one secondary winding (W2) connected to an input of a bridge rectifier (BR101), the electric control unit (ECU101) converting a portion of the direct current electrical energy from the direct current input terminals (INPT101) into the alternating polarity electric energy and then supplying the alternating polarity electric energy to the at least one primary winding (W1), and the transformer (TR101) outputting the alternating polarity electric energy from the at least one secondary winding (W2) to an input of the bridge rectifier (BR101) for conversion to auxiliary direct current electrical energy and output through auxiliary output terminals (T3); a bypass diode (CR101) parallel connected between the positive and negative terminals of the auxiliary output terminals (T3) of the bridge rectifier (BR101), a current input terminal of the bypass diode (CR101) being connected to a negative terminal of the direct current output of the bridge rectifier (BR101) and a positive one of the direct current input terminals (INPT101), and a current output terminal of the diode (CR101) being connected to a positive terminal of the direct current output of the bridge rectifier (BR101) and to a positive one of direct current output terminals (OUPT102), wherein a negative one of the direct current input terminals (INPT101) is connected to a negative one of the direct current output terminals (OUPT102), and wherein a voltage between the positive and negative output terminals (OUPT102) is a sum of a direct current voltage of the two terminals of the bypass diode (CR101) from the output of the bridge rectifier (BR101) and a voltage between the positive and negative input terminals (INPT101), thereby providing a voltage boost by the voltage formed at the bypass diode (CR101) using only said portion of the direct current electrical energy converted by the electric control unit (ECU101) and output through the at least one secondary winding (W2) of the transformer (TR101) and through the bridge rectifier (BR101).

2. A boost type direct current output control circuit device as claimed in claim 1, further comprising a ripple suppress circuit device (RFC100, RFC200) connected in parallel with the bridge rectifier (BR101) and/or a ripple suppress circuit device (RFC100,RFC200) connected in parallel with the output terminals (OUPT102) to reduce ripples in the auxiliary direct current electric energy.

3. A boost type direct current output control circuit device as claimed in claim 2, further comprising an electric energy detector installed at the output terminals (OUPT102), the electric energy detector including at least one of a voltage detector (VD100) and a current detector (ID100) for displaying an output voltage and/or current, and/or to feedback detecting signals to the electric control unit (ECU101) to thereby control the voltage and/or current output of auxiliary output terminals (T3) by controlling an electric energy input from the electric control unit (ECU101) to the at least one primary winding (W1) of the transformer (TR101).

4. A boost type direct current output control circuit device as claimed in claim 3, wherein the boost type direct current output control circuit device is arranged to execute at least one of the following control functions:

a) through operation of at least one of a current detector (ID100), manual control of an input operation device (IPD101), and the electric control unit (ECU101), a value of the output current is controlled, the control of the output current value including limiting a maximum output current;

b) through operation of at least one of the current detector (ID100), manual control of the input operation device (IPD101), and the electric control unit (ECU101), the output current is controlled as a constant or regulated output current;

c) through operation of at least one of the current detector (ID100), manual control of the input operation device (IPD101), and the electric control unit (ECU101), a value of the output current is controlled by a multi-variable control;

d) through operation of at least one of the voltage detector (VD100), manual control of the input operation device (IPD101), and the electric control unit (ECU101), a value of the output voltage is controlled, the control of the output voltage value including limiting a maximum output voltage;

e) through operation of at least one of the voltage detector (VD100), manual control of the input operation device (IPD101), and the electric control unit (ECU101), the output voltage is controlled as a constant or regulated output voltage;

f) through operation of at least one of the voltage detector (VD100), manual control of the input operation device (IPD101), and the electric control unit (ECU101), a value of the output voltage is controlled by a multi-variable control.

5. A boost type direct current output control circuit device as claimed in claim 2, further comprising an electric energy detector installed at the output terminals (OUPT102), the electric energy detector including at least one of a voltage detector (VD100) and a current detector (ID100) for displaying an output voltage and/or current, and/or to feedback detecting signals to the electric control unit (ECU101) to thereby control the voltage and/or current output of auxiliary output terminals (T3) by controlling an electric energy input from the electric control unit (ECU101) to the at least one primary winding (W1) of the transformer (TR101).

6. A boost type direct current output control circuit device as claimed in claim 5, wherein the boost type direct current output control circuit device is arranged to execute at least one of the following control functions:

a) through operation of at least one of a current detector (ID100), manual control of an input operation device (IPD101), and the electric control unit (ECU101), a value of the output current is controlled, the control of the output current value including limiting a maximum output current;

b) through operation of at least one of the current detector (ID100), manual control of the input operation device (IPD101), and the electric control unit (ECU101), the output current is controlled as a constant or regulated output current;

c) through operation of at least one of the current detector (ID100), manual control of the input operation device (IPD101), and the electric control unit (ECU101), a value of the output current is controlled by a multi-variable control;

d) through operation of at least one of the voltage detector (VD100), manual control of the input operation device (IPD101), and the electric control unit (ECU101), a value of the output voltage is controlled, the control of the output voltage value including limiting a maximum output voltage;

e) through operation of at least one of the voltage detector (VD100), manual control of the input operation device (IPD101), and the electric control unit (ECU101), the output voltage is controlled as a constant or regulated output voltage;

f) through operation of at least one of the voltage detector (VD100), manual control of the input operation device (IPD101), and the electric control unit (ECU101), a value of the output voltage is controlled by a multi-variable control.

7. A boost type direct current output control circuit device as claimed in claim 1, further comprising an input operation device (IPD101) controlled by manual operation or external signals for supplying control signals to the electric control unit (ECU101) to control a relative set transformation ratio of alternating polarity electric energy supplied by the electric control unit (ECU101) to the at least one primary winding (W1) of the transformer (TR100).

8. A boost type direct current output control circuit device as claimed in claim 7, further comprising a ripple suppress circuit device (RFC100, RFC200) connected in parallel with the bridge rectifier (BR101) or with the output terminals (OUPT102) to reduce ripples in the auxiliary direct current electric energy.

9. A boost type direct current output control circuit device as claimed in claim 8, further comprising an electric energy detector installed at the output terminals (OUPT102), the electric energy detector including at least one of a voltage detector (VD100) and a current detector (ID100) for displaying an output voltage and/or current, and/or to feedback detecting signals to the electric control unit (ECU101) to thereby control the voltage and/or current output of auxiliary output terminals (T3) by controlling an electric energy input from the electric control unit (ECU101) to the at least one primary winding (W1) of the transformer (TR101) based on the detecting signals from the electric energy detector and the control signals from the input operation device (IPD101).

10. A boost type direct current output control circuit device as claimed in claim 9, wherein the boost type direct current output control circuit device is arranged to execute at least one of the following control functions:

a) through operation of at least one of a current detector (ID100), manual control of the input operation device (IPD101), and the electric control unit (ECU101), a value of the output current is controlled, the control of the output current value including limiting a maximum output current;

b) through operation of at least one of the current detector (ID100), manual control of the input operation device (IPD101), and the electric control unit (ECU101), the output current is controlled as a constant or regulated output current;

c) through operation of at least one of the current detector (ID100), manual control of the input operation device (IPD101), and the electric control unit (ECU101), a value of the output current is controlled by a multi-variable control;

d) through operation of at least one of the voltage detector (VD100), manual control of the input operation device (IPD101), and the electric control unit (ECU101), a value of the output voltage is controlled, the control of the output voltage value including limiting a maximum output voltage;

e) through operation of at least one of the voltage detector (VD100), manual control of the input operation device (IPD101), and the electric control unit (ECU101), the output voltage is controlled as a constant or regulated output voltage;

f) through operation of at least one of the voltage detector (VD100), manual control of the input operation device (IPD101), and the electric control unit (ECU101), a value of the output voltage is controlled by a multi-variable control.

11. A boost type direct current output control circuit device as claimed in claim 7, further comprising an electric energy detector installed at the output terminals (OUPT102), the electric energy detector including at least one of a voltage detector (VD100) and a current detector (ID100) for displaying an output voltage and/or current, and/or to feedback detecting signals to the electric control unit (ECU101) to thereby control the voltage and/or current output of auxiliary output terminals (T3) by controlling an electric energy input from the electric control unit (ECU101) to the at least one primary winding (W1) of the transformer (TR101).

12. A boost type direct current output control circuit device as claimed in claim 11, wherein the boost type direct current output control circuit device is arranged to execute at least one of the following control functions:

a) through operation of at least one of the current detector (ID100), manual control of an input operation device (IPD101), and the electric control unit (ECU101), a value of the output current is controlled, the control of the output current value including limiting a maximum output current;

b) through operation of at least one of the current detector (ID100), manual control of the input operation device (IPD101), and the electric control unit (ECU101), the output current is controlled as a constant or regulated output current;

c) through operation of at least one of the current detector (ID100), manual control of the input operation device (IPD101), and the electric control unit (ECU101), a value of the output current is controlled by a multi-variable control;

d) through operation of at least one of the voltage detector (VD100), manual control of the input operation device (IPD101), and the electric control unit (ECU101), a value of the output voltage is controlled, the control of the output voltage value including limiting a maximum output voltage;

e) through operation of at least one of the voltage detector (VD100), manual control of the input operation device (IPD101), and the electric control unit (ECU101), the output voltage is controlled as a constant or regulated output voltage;

f) through operation of at least one of the voltage detector (VD100), manual control of the input operation device (IPD101), and the electric control unit (ECU101), a value of the output voltage is controlled by a multi-variable control.

13. A boost type direct current output control circuit device as claimed in claim 1, wherein the direct current electrical energy input terminals (INPT101) are connected to one of an electromechanical generator driven by mechanical, manual, or hydraulic force; a photovoltaic device that converts light energy into electric energy; an electrochemical direct current source; a biological direct current source; and a rectified alternating or variable direct current power source.

14. A boost type direct current output control circuit device as claimed in claim 1, wherein the boost type direct current output control circuit device is applied to an electric recharger with a controllable voltage and current, a DC to DC converter in which the direct current is boosted for DC output, a speed and/or torque regulator of a DC motor in which driving is varied by regulating voltage and current, a lighting adjustment device; a power supply for adjusting a temperature of an electric heating device; an electrochemical device, and a direct current welding or electricity discharging device.

* * * * *